(12) United States Patent
Woo et al.

(10) Patent No.: US 11,579,702 B2
(45) Date of Patent: Feb. 14, 2023

(54) DISPLAY DEVICE

(71) Applicant: LG DISPLAY CO., LTD., Seoul (KR)

(72) Inventors: Sangmin Woo, Paju-si (KR); JunHyeong Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/494,546

(22) Filed: Oct. 5, 2021

(65) Prior Publication Data
US 2022/0206579 A1 Jun. 30, 2022

(30) Foreign Application Priority Data
Dec. 28, 2020 (KR) .......... 10-2020-0185160

(51) Int. Cl.
*G06F 3/01* (2006.01)
*G06F 3/041* (2006.01)
*G06F 1/16* (2006.01)

(52) U.S. Cl.
CPC ............ *G06F 3/016* (2013.01); *G06F 1/1652* (2013.01); *G06F 3/0412* (2013.01); *G06F 2203/04102* (2013.01)

(58) Field of Classification Search
CPC ...... G06F 3/016; G06F 3/0416; G06F 1/1652; G06F 2203/04102
See application file for complete search history.

(56) References Cited

U.S. PATENT DOCUMENTS

| | | | |
|---|---|---|---|
| 10,782,818 B2* | 9/2020 | Deng | G06F 1/1637 |
| 2014/0098038 A1* | 4/2014 | Paek | G06F 1/1692 |
| | | | 345/173 |
| 2015/0177789 A1* | 6/2015 | Jinbo | H04M 1/0268 |
| | | | 313/511 |
| 2016/0299598 A1* | 10/2016 | Yoon | G06F 3/0447 |
| 2017/0192507 A1* | 7/2017 | Lee | B32B 7/12 |
| 2019/0025970 A1* | 1/2019 | Kim | H01L 27/3276 |
| 2021/0410306 A1* | 12/2021 | Xia | G06F 1/1652 |

FOREIGN PATENT DOCUMENTS

KR 10-2017-0079954 A 7/2017

* cited by examiner

*Primary Examiner* — Ryan A Lubitz
(74) *Attorney, Agent, or Firm* — Morgan, Lewis & Bockius LLP (57) ABSTRACT

Provided is a display device. The display device includes a display panel including a folding area and non-folding areas on both sides of the folding area. The display device also includes a support substrate disposed under the display panel. The support substrate includes a plurality of openings disposed in the folding area, and a plurality of press structures disposed in the non-folding areas. Therefore, it is possible to implement a display device that provides a tactile feedback for each touch input area.

7 Claims, 9 Drawing Sheets

DISPLAY DEVICE

CROSS-REFERENCE TO RELATED APPLICATIONS

This application claims the priority of Korean Patent Application No. 10-2020-0185160 filed on Dec. 28, 2020, in the Korean Intellectual Property Office, the disclosure of which is incorporated herein by reference.

BACKGROUND

Technical Field

The present disclosure relates to a display device, and more particularly, to a display device that provides a tactile feedback including a pressing tactile sensation.

Discussion of the Related Art

A touch panel is a device configured to sense a user's touch input, such as a touch on a screen of a display device or a gesture. The touch panel has been widely used in large-sized display devices, such as display devices of public facilities and smart TVs, in addition to portable display devices including a smart phone, a tablet PC, and the like. Operational modes of the touch panel may include a resistive mode, a capacitive mode, an optical mode, an electromagnetic (EM) mode, and the like.

However, recently, an actuator capable of sensing a user's touch input and providing a haptic effect that allows the user to feel various tactile sensations with his/her finger or stylus pen as a feedback on the user's touch input has been researched.

SUMMARY

Accordingly, embodiments of the present disclosure are directed to a display device that substantially obviates one or more of the problems due to limitations and disadvantages of the related art.

An aspect of the present disclosure is to provide a display device that has a press structure in a non-folding area.

Another aspect of the present disclosure is to provide a display device that transfers a tactile feedback for each tactile cell to which a touch pressure is applied.

Yet another aspect of the present disclosure is to provide a display device that transfers a tactile feedback through a pressing tactile sensation.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel including a folding area and non-folding areas on both sides of the folding area. The display device also includes a support substrate disposed under the display panel. The support substrate includes a plurality of openings disposed in the folding area, and a plurality of press structures disposed in the non-folding areas. Therefore, it is possible to implement a display device that provides a tactile feedback for each touch input area.

Other detailed matters of the exemplary embodiments are included in the detailed description and the drawings.

According to the present disclosure, it is possible to provide a display device that has a press structure in a non-folding area.

Also, according to the present disclosure, it is possible to implement a display device that provides a tactile feedback for each tactile cell to which a touch pressure is applied.

Further, according to the present disclosure, it is possible to implement a display device that provides a pressing tactile sensation for each tactile cell to which a touch pressure is applied.

Furthermore, according to the present disclosure, it is possible to use a flexible display panel in a non-folding area.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

Figure 1:
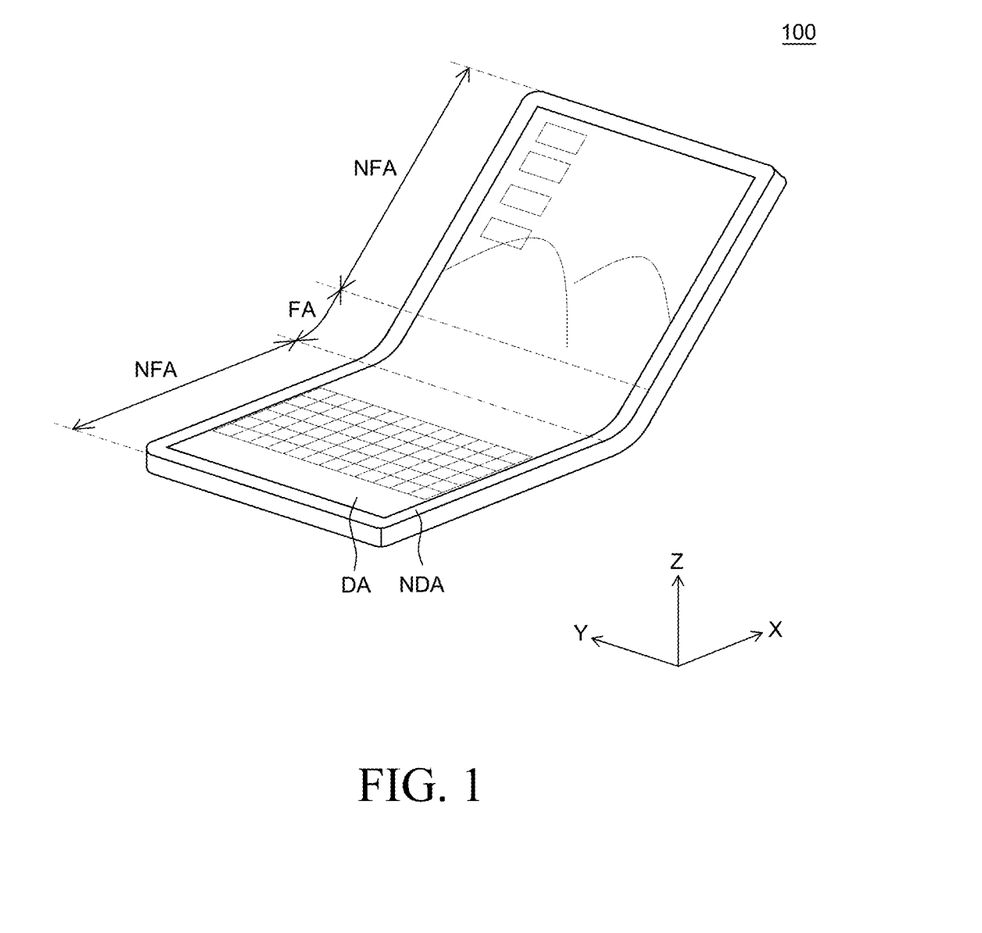
FIG. 1 is a schematic perspective view of a display device according to an exemplary embodiment of the present disclosure.
Figure 2:
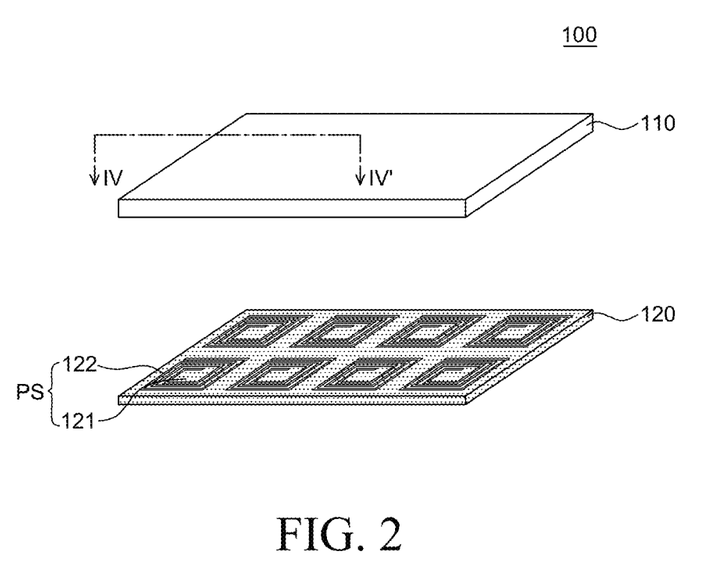
FIG. 2 is an exploded perspective view of a non-folding area of the display device according to an exemplary embodiment of the present disclosure.

FIG. 1 is a schematic perspective view of a display device according to an exemplary embodiment of the present disclosure. FIG. 2 is an exploded perspective view of a non-folding area of the display device according to an exemplary embodiment of the present disclosure. For the convenience of description, FIG. 2 illustrates only non-folding areas.

a display device 100 according to an exemplary embodiment of the present disclosure may include a display panel 110 and a support substrate 120

Referring to FIG. 1, a display device 100 according to an exemplary embodiment of the present disclosure may be folded into a laptop or tablet form. The display device 100 includes a display area DA and a non-display area NDA. In the display area DA, a plurality of pixels is disposed and images are displayed. The non-display area NDA surrounds the display area DA. In the non-display area NDA, images are not displayed, and various lines, driver ICs, printed circuit boards, and the like for driving the pixels and driving circuits disposed in the display area DA are disposed. For example, in the non-display area NDA, various ICs, such as a gate driver IC and a data driver IC, VSS lines, and the like may be disposed.

Referring to FIG. 1, the display device 100 according to an exemplary embodiment of the present disclosure includes at least one folding area FA and two or more non-folding areas NFA. The folding area FA is folded when the display device 100 is folded. The folding area FA may be folded with a specific radius of curvature around a folding axis. The non-folding areas NFA are not folded when the display device 100 is folded. That is, the non-folding areas NFA maintain a flat state when the display device 100 is folded. The non-folding areas NFA may be located on one side or both sides of the folding areas FA. For example, if the folding axis of the folding area FA is formed in a Y-axis direction, the non-folding areas NFA are defined as extended from the folding area FA in an X-axis direction perpendicular to the folding axis.

FIG. 1 and FIG. 2 illustrate that the display device includes the folding area FA and the two non-folding areas NFA on both sides of the folding area FA. The numbers and positions of folding areas FA and non-folding areas NFA may be changed variously, but are not limited thereto.

Referring to FIG. 2, a display panel 110 is a panel on which images are implemented. In the display panel 110, display elements for implementing images, circuit units for driving the display elements, and the like may be disposed. For example, if the display device 100 is an organic light emitting display device, the display elements may include organic light emitting elements.

Hereinafter, for the convenience of description, it is assumed that the display device 100 according to various exemplary embodiments of the present disclosure is a foldable organic light emitting display device including organic light emitting elements. However, the present disclosure is not limited thereto.

The circuit units may include various thin film transistors, capacitors, lines, and driver ICs for driving the organic light emitting elements. For example, the circuit units may include various components such as a driving thin film transistor, a switching thin film transistor, a storage capacitor, a gate line, a data line, a gate driver IC and a data driver IC, but are not limited thereto.

A support substrate 120 is disposed under the display panel 110. The support substrate 120 may be made of metal materials such as stainless steel (SUS), SUS containing another metal such as nickel (Ni), Invar, iron (Fe), aluminum (Al)-based or magnesium (Mg). For example, the support substrate 120 may be made of SUS, and SUS has a high restoring force and a high rigidity. Thus, even when the support substrate 120 decreases in thickness, a certain degree of rigidity may be maintained.

A plurality of openings (not shown) is disposed in the folding area FA of the support substrate 120. The folding properties may be regulated by regulating the number and size of the plurality of openings (not shown). The durability of the support substrate 120 may be maintained and an external stress generated during folding may be decreased by using the plurality of openings (not shown). Also, the folding properties may be improved by regulating the radius of curvature. The shape of an opening (not shown) may be an oval shape or a rectangular shape, but is not limited thereto, and may be optionally changed as necessary.

A plurality of press structures PS is disposed in the non-folding area NFA of the support substrate 120. In general, a tactile feedback is generated when an electroactive layer entirely or partially vibrates regardless of a touch input area. However, in the support substrate 120 of the display device 100 according to an exemplary embodiment of the present disclosure, the press structures PS are disposed. Thus, it is possible to provide a vibration and a pressing tactile sensation for each touch input area. For example, the press structures PS are disposed in a keyboard arrangement in the support substrate 120 so as to correspond to respective key areas. Thus, the display area DA of the display device 100 may transfer a tactile feedback, which may be felt as if a user presses the keyboard, to the user. The press structures PS will be described in more detail with reference to FIG. 3.

Figure 3:
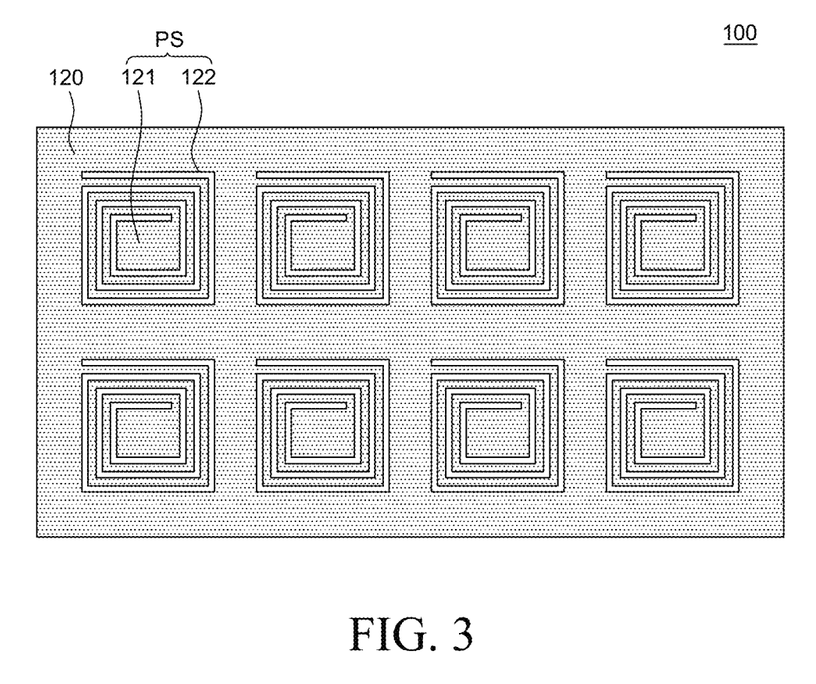
FIG. 3 is a schematic plan view of a support substrate of the display device according to an exemplary embodiment of the present disclosure.
Figure 4:
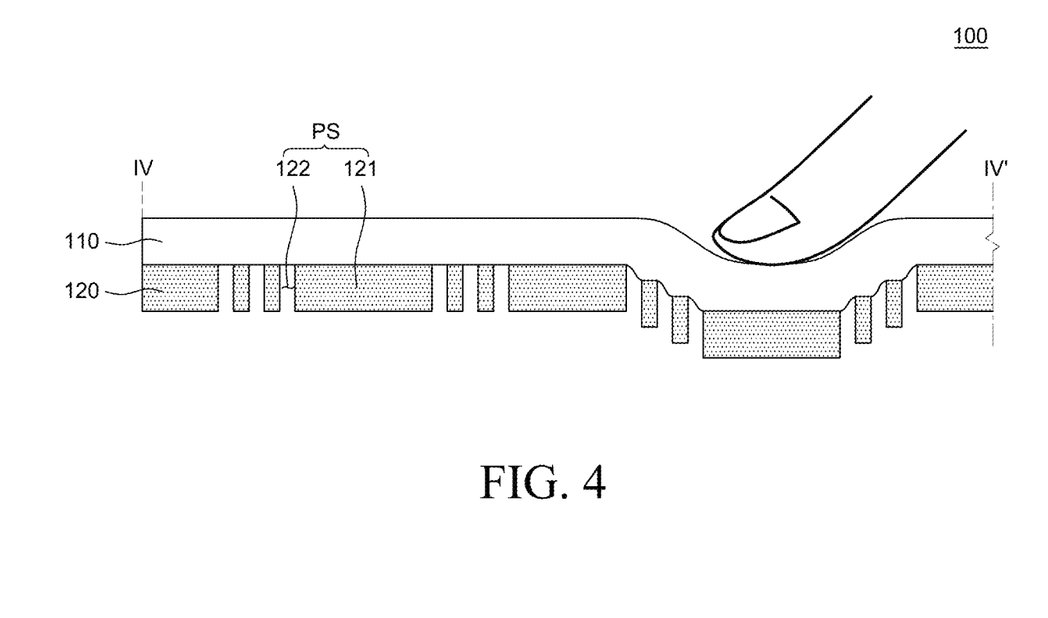
FIG. 4 is a schematic cross-sectional view as taken along a line IV-IV' of FIG. 2.

FIG. 3 is a schematic plan view illustrating an upper surface of a support substrate of the display device according to an exemplary embodiment of the present disclosure. FIG. 4 is a schematic cross-sectional view as taken along a line IV-IV' of FIG. 2. For the convenience of description, FIG. 3 and FIG. 4 illustrate only the non-folding area NFA or the support substrate 120 of the display device 100.

Referring to FIG. 3, the support substrate 120 includes a plurality of press structures PS. Each of the plurality of press structures PS includes a planar portion 121 that may be moved down when a touch pressure is applied thereto and a hole 122 surrounding a part of the planar portion 121. The hole 122 may have a spiral shape surrounding the planar portion 121 when viewed from the upper surface of the support substrate 120. As shown in FIG. 3, the spiral hole 122 may be the hole 122 having a rectangular spiral shape. A center of the planar portion 121 may have a shape similar to a rectangular shape according to the rectangular spiral hole 122. However, the spiral hole 122 having a curve structure and the center of the planar portion 121 may have a circular shape, but the present disclosure is not limited thereto.

Referring to FIG. 4, when a touch pressure is applied to the display panel 110 that overlaps the press structures PS, the spiral planar portion 121 is moved down so that a depression is formed. Then, when the touch pressure is removed, a pattern is restored to its original state by elasticity of the pattern. Therefore, it is possible to transfer a tactile feedback to the user through a pressing tactile sensation.

Accordingly, in the display device 100 according to an exemplary embodiment of the present disclosure, the support substrate 120 including the press structures PS is disposed under the display panel 110. Thus, when the user makes a touch input to the press structures PS, a tactile feedback may be transferred through a pressing tactile sensation. The flexible display panel 110 of which only the folding area has been conventionally used may also be used in the display area DA of the non-folding area NFA. Also, a conventional display device transfers a tactile feedback to all or a part of a display area regardless of a touch input area. Meanwhile, a display device according to the present disclosure may transfer a tactile feedback to each area to which a touch pressure is applied.

Figure 5:
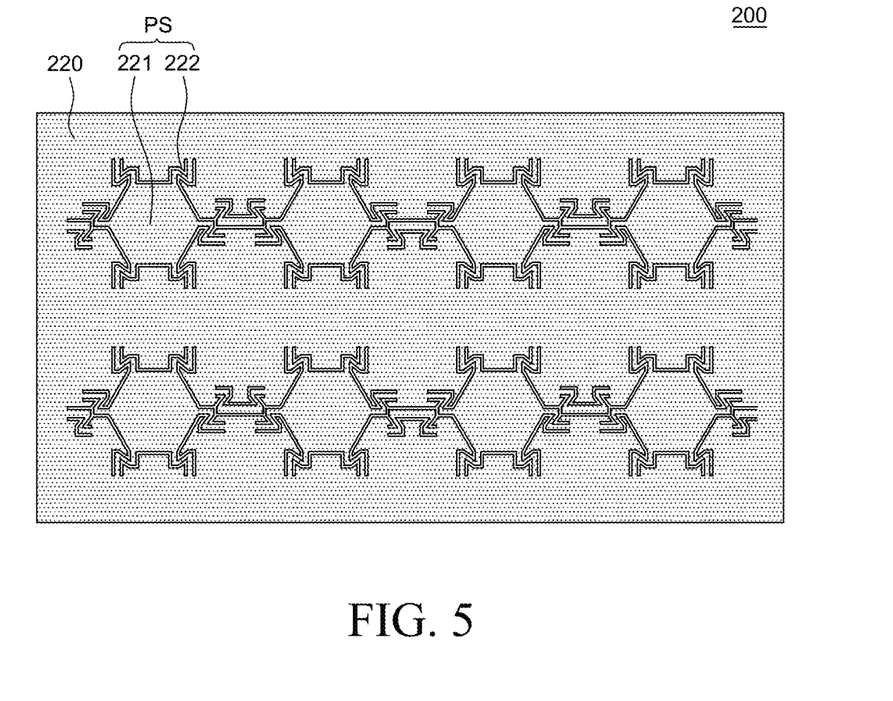
FIG. 5 is a schematic plan view of a support substrate of a display device according to another exemplary embodiment of the present disclosure.

FIG. 5 is a schematic plan view illustrating an upper surface of a support substrate of a display device according to another exemplary embodiment of the present disclosure. A display device 200 shown in FIG. 5 has substantially the same configuration as the display device 100 shown in FIG. 3 except the press structures PS in a support substrate 220. Thus, a repeated description will be omitted.

Referring to FIG. 5, each of a plurality of planar portions 221 and each of a plurality of holes 222 are disposed corresponding to each of the plurality of press structures PS. Each hole 222 may include a zigzag shape surrounding the planar portion 221 when viewed from the upper surface of the support substrate 220. A planar portion 221 formed by the zigzag shapes functions as a connector to connect a planar portion 221 disposed at the center to an outer planar portion 221 while enabling the planar portion 221 to be moved down. As shown in FIG. 5, a planar portion 221 in each press structure PS may have a shape similar to a hexagonal shape and zigzag holes 222 may be disposed at respective corners of the planar portion 221. The shape of the planar portion 221 and the number of holes 222 may be optionally changed as necessary.

Accordingly, in the display device 200 according to another exemplary embodiment of the present disclosure, the support substrate 220 including the press structures PS is disposed under the display panel 110. Thus, when the user makes a touch input to the press structures PS, a tactile feedback may be transferred through a pressing tactile sensation. The flexible display panel 110 of which only the folding area has been conventionally used may also be used in the display area DA of the non-folding area NFA. Also, a conventional display device transfers a tactile feedback to all or a part of a display area regardless of a touch input area. Meanwhile, a display device according to the present disclosure may transfer a tactile feedback to each area to which a touch pressure is applied.

Figure 6:
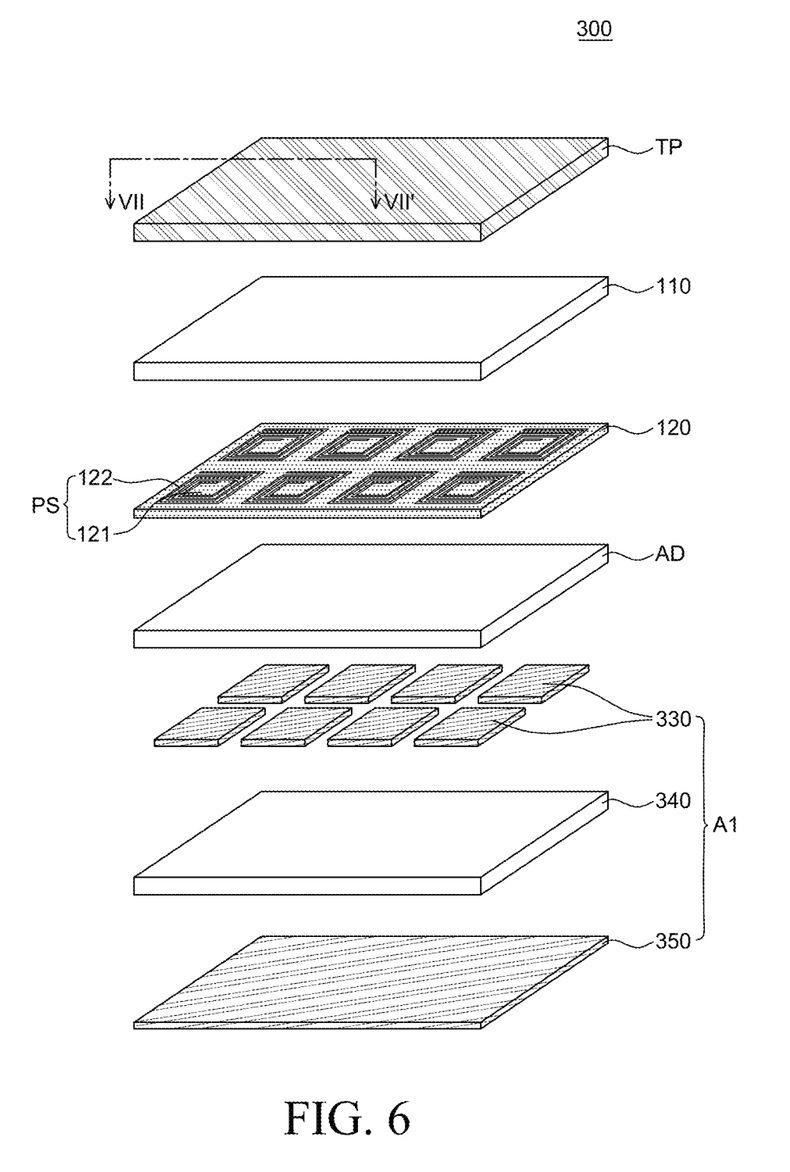
FIG. 6 is an exploded perspective view of a non-folding area of a display device according to yet another exemplary embodiment of the present disclosure.

FIG. 6 is an exploded perspective view of a non-folding area of a display device according to yet another exemplary embodiment of the present disclosure. A display device 300 shown in FIG. 6 has substantially the same configuration as the display device 100 shown in FIG. 2 except a touch panel TP and an actuator A1. Thus, a repeated description will be omitted.

Referring to FIG. 6, in the display device 300 according to yet another exemplary embodiment of the present disclosure, the touch panel TP is disposed on the display panel 110. Also, the support substrate 120 is disposed under the display panel 110 and an adhesive layer AD is disposed under the support substrate 120. Further, the actuator A1 is disposed under the adhesive layer AD.

The touch panel TP is disposed on the display panel 110. The touch panel TP is a panel that receives the user's touch input to the display device. For example, a capacitive type touch panel, a resistive type touch panel, an ultrasonic type touch panel or an infrared ray type touch panel may be used as the touch panel TP. Preferably, a capacitive type touch panel TP may be used as the touch panel TP. Although FIG. 6 illustrates that the touch panel TP is disposed on the display panel 110, the touch panel TP may also be disposed under the display panel 110. Alternatively, the touch panel TP may be formed as one body with the display panel 110.

The actuator A1 includes an electroactive layer 340, a first electrode 350 and a second electrode 330. The electroactive layer 340 is a flat film made of an electroactive polymer which is a polymer material modified by electrical stimulation. For example, the electroactive layer 340 may be made of a dielectric elastomer, such as silicon (Si)-based, polyurethane (PU)-based, and acrylic based-elastomer, or a relaxor ferroelectric polymer, such as PVDF-TrFE-CFE and PVDF-TrFE-CTFE. When the electroactive layer 340 is made of a dielectric elastomer, the dielectric elastomer contracts and expands due to a Coulombic force acting on the electroactive layer 340 generated as a voltage is applied to the first electrode 350 and the second electrode 330. Thus, the actuator A1 vibrates. Also, when the electroactive layer 340 is made of a relaxor ferroelectric polymer, an alignment direction of dipoles in the electroactive layer 340 changes as a voltage is applied to the electroactive layer 340. Thus, the electroactive layer 340 contracts and expands so that the actuator A1 vibrates.

A plurality of electrodes is disposed on both surfaces of the electroactive layer 340. The plurality of electrodes includes the first electrode 350 and the second electrode 330. The first electrode 350 and the second electrode 330 are provided to apply a voltage to the electroactive layer 340 and made of a conductive material. Further, in order to secure a high transmittance of the actuator A1, the first electrode 350 and the second electrode 330 may be made of a transparent conductive material. For example, the first electrode 350 and the second electrode 330 may be made of a transparent conductive material such as indium tin oxide (ITO), aluminum doped zinc oxide (AZO), fluorine tin oxide (FTC), or silver nano wire (AgNW). Alternatively, the first electrode 350 and the second electrode 330 may be made of a metal mesh. That is, the first electrode 350 and the second electrode 330 may be made of a metal mesh in which a metal material is disposed in the form of a mesh. Thus, the first electrode 350 and the second electrode 330 may function as transparent electrodes. However, a composition material of the first electrode 350 and the second electrode 330 is not limited to the above-described examples. Various transparent conductive materials may be used as a composition material of the first electrode 350 and the second electrode 330. The first electrode 350 and the second electrode 330 may be made of the same material or different materials.

The first electrode 350 is disposed on one surface of the electroactive layer 340, while the second electrode 330 is disposed on the other surface of the electroactive layer 340. For example, the first electrode 350 may be disposed on a lower surface of the electroactive layer 340 and the second electrode 330 may be disposed on an upper surface of the electroactive layer 340. As shown in FIG. 6, the second electrode 330 may be patterned into a plurality of cell units.

The area of the second electrode 330 corresponds to the areas of tactile cells. The area of each tactile cell may be determined in consideration of the size of a finger of an ordinary person. Since the actuator A1 transfers a tactile feedback on a touch input of the user, the tactile cell as a minimum unit area which transfers a tactile feedback to the user may be determined in consideration of a region where the touch input of the user is generated. In this case, since the region where the touch input of the user is generated is determined depending on the size of a finger of an ordinary person, the area of the tactile cell may also be determined based on the size of a finger of an ordinary person.

In some exemplary embodiments, the area of the tactile cell may also be determined in consideration of the area of a touch cell of the touch panel TP which may be used together with the actuator A1. Here, the touch cell of the touch panel TP refers to a minimum unit which senses a touch input of the user. When the area of the tactile cell of the touch element is determined in consideration of the area of the touch cell, the tactile cell may correspond to the touch cell of the touch panel TP in one to one correspondence. In this case, the actuator A1 may provide a tactile feedback at an accurate touch point to which a touch input of the user is applied.

The first electrode 350 is composed of a single electrode. In this case, a reference voltage may be applied to the first electrode 350. For example, the second electrode 330 may be grounded. In this case, an electric field is applied to the electroactive layer 340 based on a potential difference between the first electrode 350 and pattern electrodes of the second electrode 330. However, the present disclosure is not limited thereto. The first electrode 350 may include a plurality of second pattern electrodes corresponding to the pattern electrodes of the second electrode 330. In this case, tactile cells of the actuator A1 may generate vibrations of various frequencies. Specifically, voltages of different frequencies from each other may be applied between the second pattern electrodes and the pattern electrodes corresponding thereto. In this case, the tactile cells corresponding to the pattern electrodes and the second pattern electrodes may generate vibrations of different frequencies, respectively.

The adhesive layer AD may cover one surface of the electroactive layer 340, and a vibration generated in the electroactive layer 340 may be transferred through the adhesive layer AD. That is, the adhesive layer AD is used as a vibration transfer layer that transfers a vibration generated in the electroactive layer 340. Specifically, the adhesive layer AD is configured to transfer a vibration component in a direction perpendicular to one surface of the electroactive layer 340 and absorb a vibration component in a direction parallel to one surface of the electroactive layer 340, among a vibration generated in the electroactive layer 340. This will be described later with reference to FIG. 7.

Hereinafter, a process of transferring a tactile feedback in response to a touch input in a tactile cell that receives a touch input will be described in detail with reference to FIG. 7 as well.

Figure 7:
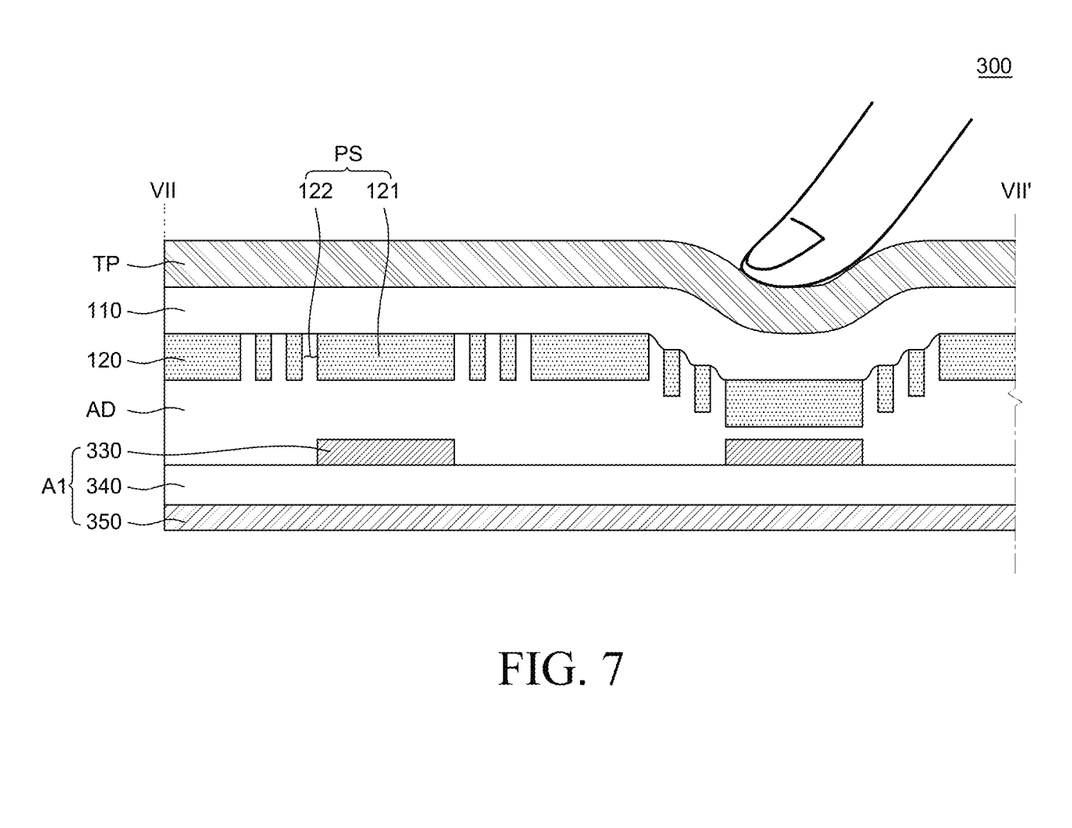
FIG. 7 is a schematic cross-sectional view as taken along a line VII-VII' of FIG. 6.

FIG. 7 is a schematic cross-sectional view as taken along a line VII-VII' of FIG. 6.

Referring to FIG. 7, when the user's touch input is made, the touch panel TP may sense a position of the touch input. Thus, a driving voltage may be applied to the first electrode 350 and the second electrode 330 located corresponding to the position of the touch input sensed by the touch panel TP. Therefore, a vibration is generated in a specific tactile cell where the first electrode 350 and the second electrode 330 to which the voltage is applied overlap. The vibration generated in the electroactive layer 340 is transferred to an upper part through the second electrode 330.

In the display device 300 according to yet another exemplary embodiment of the present disclosure, a tactile feedback may be transferred through a pressing tactile sensation by the support substrate 120 including a plurality of press structures PS disposed in the non-folding area and a vibration by the actuator A1. Particularly, a tactile feedback may be transferred only to the touch panel TP corresponding to a specific tactile cell to which the touch input is made. Also, the flexible display panel 110 of which only the folding area has been conventionally used may also be used in the display area DA of the non-folding area NFA.

Figure 8:
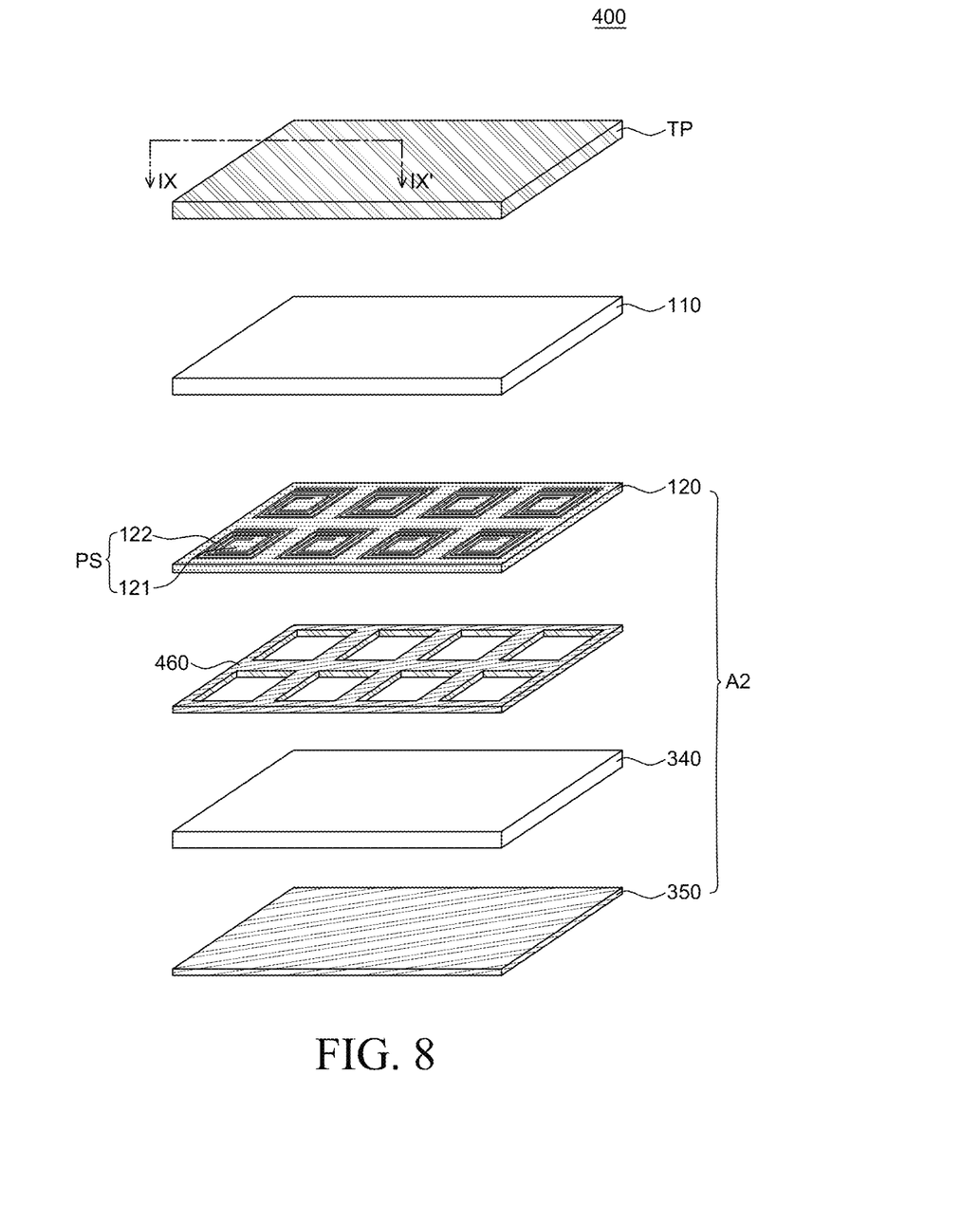
FIG. 8 is an exploded perspective view of a non-folding area of a display device according to still another exemplary embodiment of the present disclosure.

FIG. 8 is an exploded perspective view of a non-folding area of a display device according to still another exemplary embodiment of the present disclosure. A display device 400 shown in FIG. 8 has substantially the same configuration as the display device 300 shown in FIG. 6 except a spacer 460 and an actuator A2. Thus, a repeated description will be omitted.

Referring to FIG. 8, in the display device 400 according to still another exemplary embodiment of the present disclosure, the actuator A2 may include the first electrode 350, the electroactive layer 340 and the support substrate 120 serving as a second electrode. That is, the support substrate 120 may serve as a second electrode without using an additional second electrode. Therefore, the spacer 460 is disposed so that the electroactive layer 340 and the support substrate 120 may be spaced apart from each other.

The first electrode 350 is disposed on one surface of the electroactive layer 340, while the support substrate 120 is disposed on the other surface of the electroactive layer 340. For example, the first electrode 350 may be disposed on a lower surface of the electroactive layer 340 and the second electrode may be disposed on an upper surface of the electroactive layer 340. As shown in FIG. 8, the press structures PS of the support substrate 120 may be disposed in a plurality of cell units.

The area of each of the press structures PS of the support substrate 120 corresponds to the areas of tactile cells. The area of each tactile cell may be determined in consideration of the size of a finger of an ordinary person.

When a reference voltage is applied to the first electrode 350, the support substrate 120 may be grounded. In this case, an electric field is applied to the electroactive layer 340 based on a potential difference between a pattern electrode of the first electrode 350 and the press structures PS of the support substrate 120.

The spacer 460 is made of an insulating material so that the support substrate 120 and the electroactive layer 340 are not grounded when a touch input is not made. The spacer 460 may be formed at the circumference of the plurality of press structures PS of the support substrate 120, but is not limited thereto.

Hereinafter, a process of transferring a tactile feedback in response to a touch input in a tactile cell that receives a touch input will be described in detail with reference to FIG. 9 as well.

Figure 9:
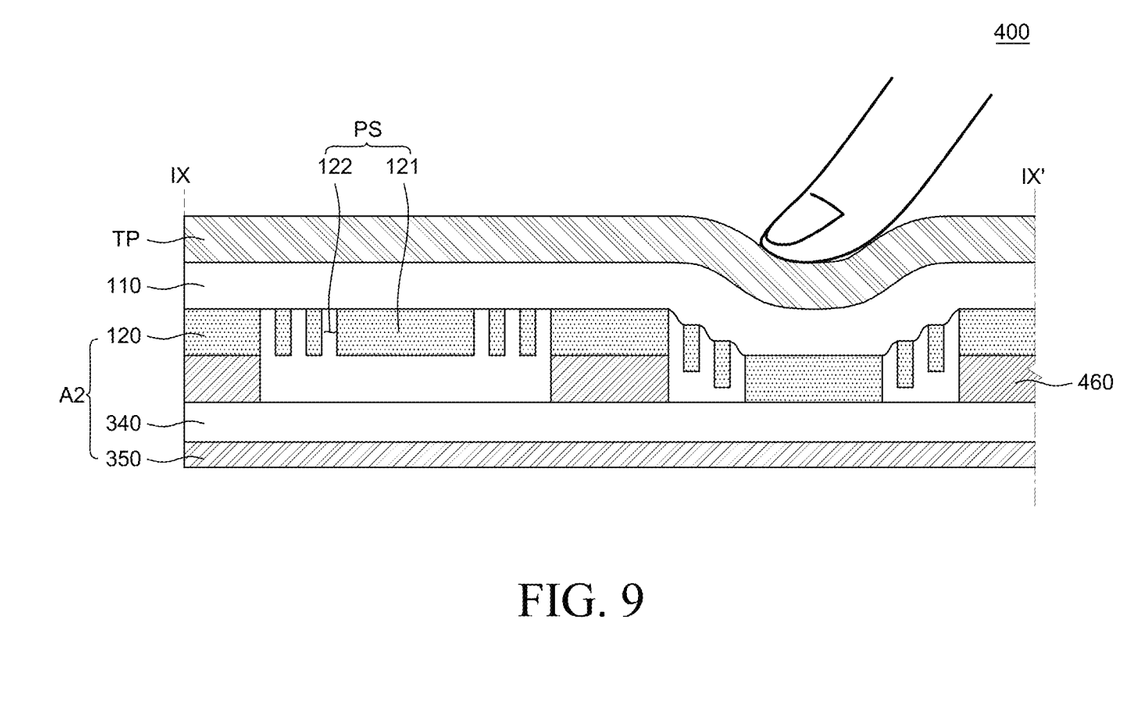
FIG. 9 is a schematic cross-sectional view as taken along a line IX-IX' of FIG. 8.

FIG. 9 is a schematic cross-sectional view as taken along a line IX-IX' of FIG. 8.

Referring to FIG. 9, when the user's touch input is made, the touch panel TP may sense a position of the touch input. Thus, a driving voltage may be applied to the first electrode 350 and the support substrate 120 located corresponding to the position of the touch input sensed by the touch panel TP. Therefore, a vibration is generated in a specific tactile cell where the first electrode 350 and the support substrate 120 to which the voltage is applied overlap. The vibration generated in the electroactive layer 340 is transferred to an upper part through the support substrate 120.

In the display device 400 according to still another exemplary embodiment of the present disclosure, a tactile feedback may be transferred through a pressing tactile sensation by the support substrate 120 including a plurality of press structures disposed in the non-folding area and a vibration by the actuator A2. Particularly, a tactile feedback may be transferred only to the touch panel TP corresponding to a specific tactile cell to which the touch input is made. Also, the flexible display panel 110 of which only the folding area has been conventionally used may also be used in the display area DA of the non-folding area NFA.

The exemplary embodiments of the present disclosure can also be described as follows:

According to an aspect of the present disclosure, there is provided a display device. The display device includes a display panel including a folding area and non-folding areas on both sides of the folding area. The display device further includes a support substrate disposed under the display panel. The support substrate includes a plurality of openings disposed in the folding area and a plurality of press structures disposed in the non-folding areas.

Each of the plurality of press structures may include a planar portion and a hole surrounding a part of the planar portion.

The hole may have a spiral shape surrounding the planar portion.

The hole may include a zigzag shape.

The display device may further include a touch panel configured to receive a user's touch input. The display device may further include an actuator disposed under the support substrate. The actuator may transfer a tactile feedback in response to the user's touch input.

The actuator may include an electroactive layer. The actuator may further include a first electrode disposed under the electroactive layer. The actuator may further include a plurality of second electrodes disposed on the electroactive layer and under the plurality of press structures.

The display device may further include a spacer disposed under the support substrate. The display device may further include an electroactive layer disposed under the spacer. The display device may further include a first electrode disposed under the electroactive layer.

The plurality of press structures, the electroactive layer and the first electrode may constitute an actuator.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a display panel including a folding area and non-folding areas on both sides of the folding area; and
   a support substrate disposed under the display panel,
   wherein the support substrate includes:
   a plurality of press structures disposed in the non-folding areas,
   wherein each of the plurality of press structures includes:
   a planar portion to be moved down when a touch pressure is applied; and
   a hole surrounding a part of the planar portion and forming elasticity to restore to the planar portion original state when the touch pressure is removed.

2. The display device according to claim 1, wherein the hole has a spiral shape surrounding the planar portion.

3. The display device according to claim 1, wherein the hole includes a zigzag shape.

4. The display device according to claim 1, further comprising:
   a touch panel configured to receive a user's touch input; and
   an actuator disposed under the support substrate,
   wherein the actuator transfers a tactile feedback in response to the user's touch input.

5. The display device according to claim 4, wherein the actuator includes:
   an electroactive layer;
   a first electrode disposed under the electroactive layer; and
   a plurality of second electrodes disposed on the electroactive layer and under the plurality of press structures.

6. The display device according to claim 1, further comprising:
   a spacer disposed under the support substrate;
   an electroactive layer disposed under the spacer; and
   a first electrode disposed under the electroactive layer.

7. The display device according to claim 6, wherein the plurality of press structures, the electroactive layer and the first electrode constitute an actuator.

* * * * *